No. 654,078. Patented July 17, 1900.
H. H. STRATTON.
WINDOW SHADE HANGER.
(Application filed Oct. 18, 1899.)
(No Model.)
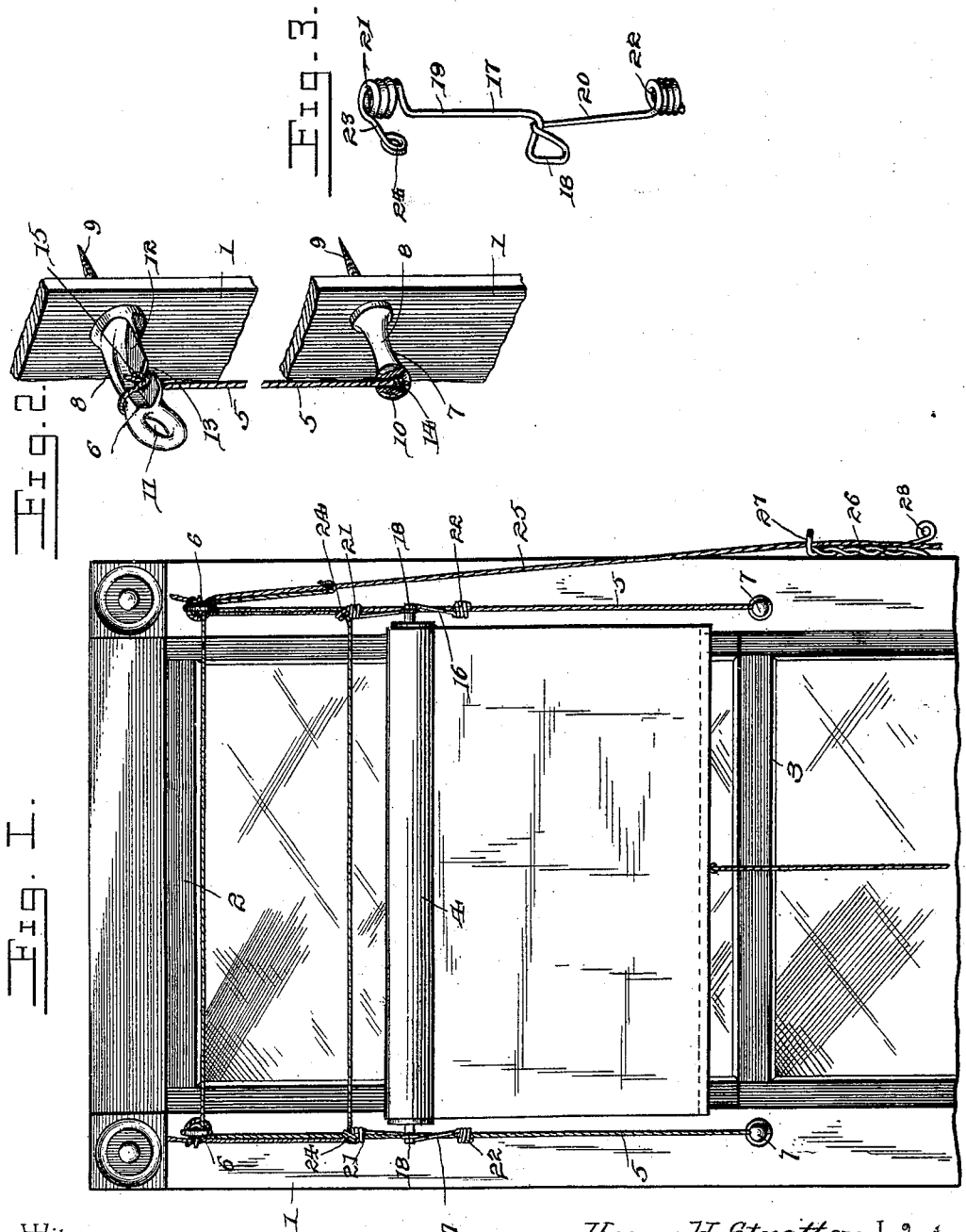
Witnesses
F. E. Alden.
Henry H. Stratton, Inventor.
By his Attorneys,
C. A. Snow & Co.

UNITED STATES PATENT OFFICE.

HENRY H. STRATTON, OF SAN FRANCISCO, CALIFORNIA.

WINDOW-SHADE HANGER.

SPECIFICATION forming part of Letters Patent No. 654,078, dated July 17, 1900.

Application filed October 18, 1899. Serial No. 734,015. (No model.)

*To all whom it may concern:*

Be it known that I, HENRY H. STRATTON, a citizen of the United States, residing at San Francisco, in the county of San Francisco and State of California, have invented a new and useful Window-Shade Hanger, of which the following is a specification.

This invention relates to shade-roller hangers, and has for its object to provide an improved guide for slidably supporting the roller-brackets, so that the shade-roller may be adjusted vertically upon the guide, thereby to admit light and ventilation at a point above the shade-roller, and also to provide for the convenient application and removal of the guide, so that the latter may be applied to any window-frame.

To these ends the present invention consists in the combination and arrangement of parts, as will be hereinafter more fully described, shown in the accompanying drawings, and particularly pointed out in the appended claim, it being understood that changes in the form, proportion, size, and minor details may be made within the scope of the appended claim without departing from the spirit or sacrificing any of the advantages of the invention.

In the drawings, Figure 1 is an elevation of the upper portion of a window having a shade-roller mounted thereon by means of the present invention. Fig. 2 is a detail perspective view illustrating one of the improved guides. Fig. 3 is a detail perspective view of one of the roller-brackets.

Corresponding parts in the several figures of the drawings are designated by like characters of reference.

Referring to the accompanying drawings, 1 designates a window-frame having the usual upper and lower sashes 2 and 3, respectively, and provided with a shade-roller 4. These parts may be of any preferred type; but the curtain should be mounted upon a spring-roller, and said parts have been shown in the drawings to more fully illustrate the application and operation of the present device.

In carrying out the invention I prefer to employ cords 5 for the guides upon which the roller-brackets are mounted, and have therefore provided upper and lower fastening devices 6 and 7, respectively, for the upper and lower ends of the cord, whereby the latter may be firmly secured to the window-frame. These fastenings are best shown in Fig. 2 of the drawings, and each comprises a substantially-straight head 8, having a screw-threaded shank 9, whereby the devices may be fastened to the woodwork of the window-frame. The lower fastening 7 is provided with a tapered opening 10, which extends transversely through the head and located adjacent to the outer end thereof, the lower end of the opening being enlarged or countersunk. The upper fastening 6 is provided with a laterally-disposed eye or opening 11, which is located at the outer end of the device, and the latter is also provided with a longitudinal rib 12, extending from the inner end of the eye 11 to the base of the head and located upon the outer side thereof. In the normal position of this latter fastening the rib 12 is disposed horizontally and is provided in its outer edge with a notch 13, the latter being alined vertically with the opening in the lower fastening when both of the fastenings have been applied to the window-frame.

To secure the cord in place, the lower end thereof is provided with a knot 14, and the upper end of the cord is passed upwardly through the opening in the lower fastening 7 until the knot 14 binds in the smaller portion of the opening 10 and forms a stop to securely anchor the lower end of the cord. The upper portion of the cord is then engaged with the notch 13 in the rib of the upper fastening and wrapped around the head of the fastening and again into the notch 13, after which a knot 15 is formed in the cord, so as to bear against the upper side of the rib 12, and thereby secure the upper end of the cord. By this means the cord can be made perfectly taut and the fastenings may be applied to windows of different lengths, as the cord may be lengthened or shortened to suit the application thereof.

It will of course be understood that each side of the window-frame is provided with a guide constructed as hereinbefore described, and the shade-roller is provided with opposite roller-brackets 16 and 17, respectively, for mounting the roller upon the guides. These roller-brackets are duplicates in construction, and therefore a description of one of the brackets is deemed sufficient. As illustrated in Fig. 3, each bracket is formed from a single length of wire bent or twisted intermediate of its ends into a laterally-projecting eye 18 for the reception of one of the pivots of the shade-roller. From this eye the straight portions 19 and 20 of the wire extend upwardly and downwardly, respectively, and the outer ends thereof are coiled into the respective upper and lower eyes 21 and 22, which are located at the same side of the straight portions 19 and 20 and opposite the eye 18, and, furthermore, are alined vertically. From the upper eye 21 the extremity of the wire is formed into an arm 23, projecting outwardly in the same direction as the eye 18 and having its outer end twisted into a laterally-disposed eye 24.

The brackets thus formed are mounted upon the vertical guides before the latter are secured to the upper fastenings, and the cords are passed loosely upward through the vertically-alined eyes 21 and 22, so that the brackets may be slidably mounted upon the guides, and after the upper ends of the cord have been secured the opposite journals of the shade-roller are engaged with the intermediate eyes 18 of the respective roller-brackets.

To provide for raising and lowering the shade-roller upon the guides, I employ a cord 25 or other suitable flexible connection, which is passed from the outside and laterally inward through the eye 11 of one of the upper fastenings 6, thence across the window and through the eye of the opposite upper fastening, thence downward and laterally inward through the eye 24 upon the upper end of the adjacent roller-bracket 17, thence transversely across the window and upwardly through the upper eye 24 of the opposite roller-bracket 16, and finally upward and outward through the original fastening 6 and secured to an intermediate portion of the cord 25. By this arrangement it will be apparent that by operation of the cord 25 the latter may be caused to pass through the several eyes, thereby raising or lowering the roller-brackets, and consequently the shade-roller, so as to permit of ventilation or the entrance of light above the shade-roller.

In order that the shade-roller may be held at any desired vertical adjustment, I have provided a clamp or fastening device 26, having an eye 27 for the free reception of the cord 25, and also a spring-jaw 28 for clamping the free end of the cord against the body of the fastening device, whereby the shade-roller may be held in any vertically-adjusted position.

Having thus described the invention, what is claimed is—

In a window-shade fixture, the combination with a shade-roller, having opposite roller-brackets, and a flexible suspending device for the latter, of flexible guides for the brackets, and fastenings for the guides, each upper fastening comprising a head having an attaching shank at one end, an eye at the opposite end thereof, and a longitudinal rib extending between the shank and the eye, and provided with a notch, the flexible guides being wrapped upon the respective heads and engaged with the notches thereof, and the flexible suspending device passing loosely through the eyes, and supported thereby.

In testimony that I claim the foregoing as my own I have hereto affixed my signature in in the presence of two witnesses.

HENRY H. STRATTON.

Witnesses:
F. L. PALMER,
JAS. T. KENNY.